United States Patent [19]
Davis et al.

[11] 4,036,260
[45] July 19, 1977

[54] GATE VALVE WITH EXPANDABLE AND CONTRACTABLE CLOSURE MEMBER

[76] Inventors: Albert Sidney Davis, 11822 S. Evelyn Circle, Houston, Tex. 77071; Robert William Davis, 4310 Goldfinch, Houston, Tex. 77035; Joseph Paul Weber, Rte. 1, Box 589A, Alvin, Tex. 77511

[21] Appl. No.: 590,686

[22] Filed: June 26, 1975

[51] Int. Cl.² ............................................. F16K 3/18
[52] U.S. Cl. .................................. 138/94.3; 137/242; 251/187; 251/204
[58] Field of Search ........................ 137/242, 329.04; 251/167, 158, 187, 195, 204, 326; 222/148; 138/94.3, 94

[56] References Cited

U.S. PATENT DOCUMENTS

| 337,438 | 3/1886 | Royce | 137/242 |
| 1,085,013 | 1/1914 | Bordo | 137/329.03 |
| 1,250,041 | 12/1917 | Snyder | 251/187 |
| 1,311,332 | 7/1919 | Edwards | 138/94.3 |
| 2,676,780 | 4/1954 | Wheatley | 251/204 |
| 2,861,770 | 11/1958 | Bredtschneider | 251/167 |
| 3,072,378 | 1/1963 | Holderer | 251/204 X |
| 3,182,954 | 5/1965 | Borger | 251/204 X |

FOREIGN PATENT DOCUMENTS

| 18,269 | 8/1902 | United Kingdom | 137/329.04 |

*Primary Examiner*—Martin P. Schwadron
*Assistant Examiner*—Richard Gerard
*Attorney, Agent, or Firm*—Bill B. Berryhill

[57] ABSTRACT

A valve comprising: a housing having an opening therethrough around which is provided a seat; a closure assembly for blocking flow through the opening and for sealing engagement with the seat; and an actuator assembly connected to the closure assembly for moving the closure assembly between a first position, out of the flow path of the opening, to a second position, in the flow path, and for expanding the closure assembly for sealing engagement with the seat.

25 Claims, 8 Drawing Figures

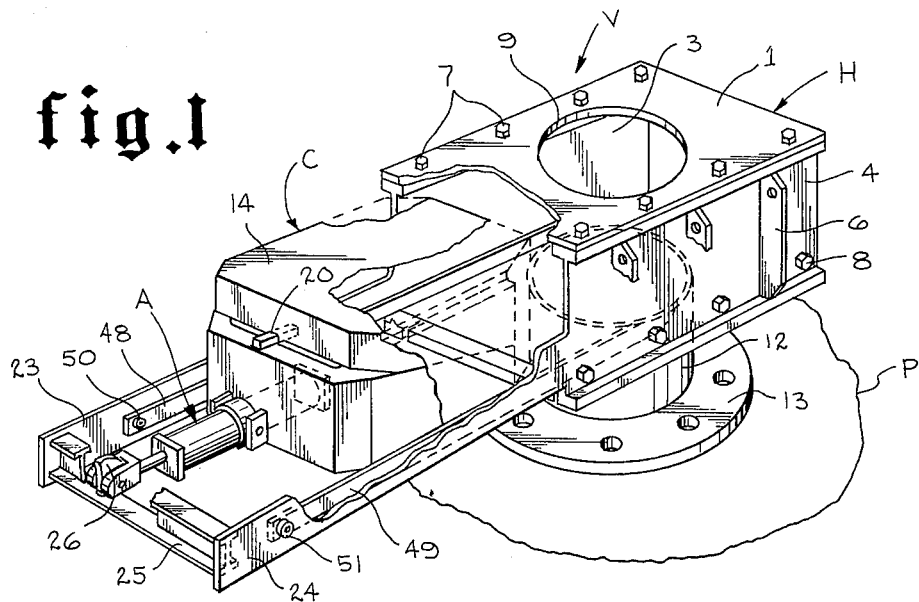
fig.1
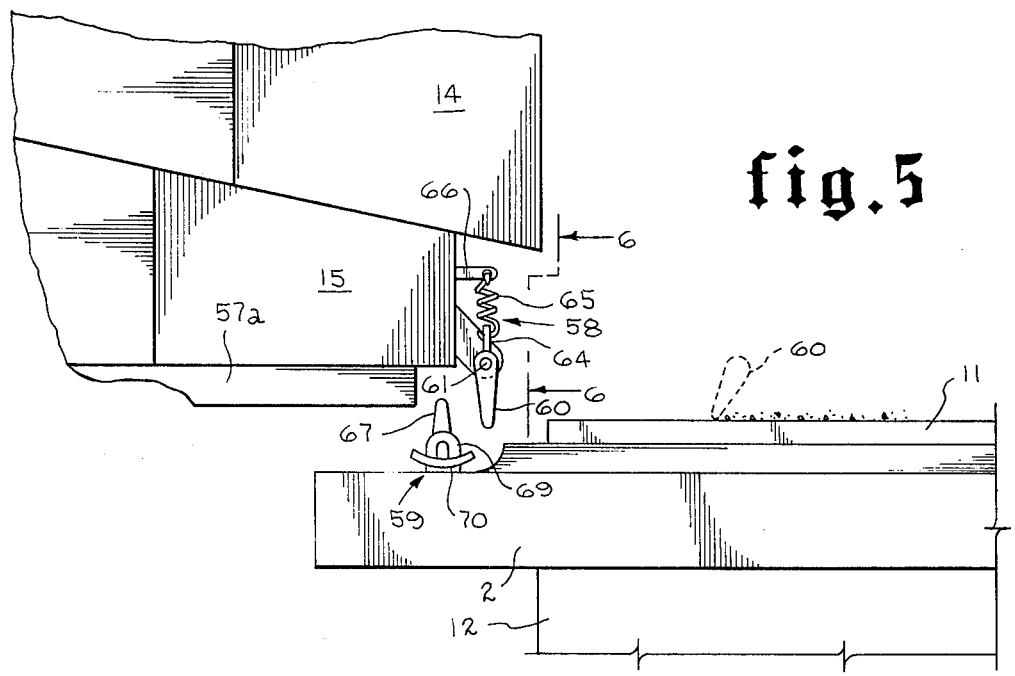
fig.5
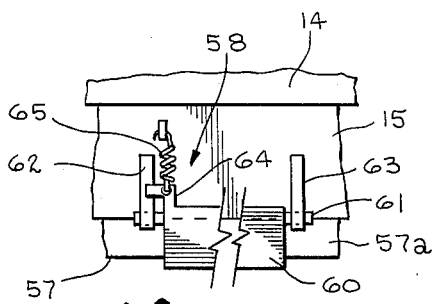
fig.6
fig.7

GATE VALVE WITH EXPANDABLE AND CONTRACTABLE CLOSURE MEMBER

BACKGROUND OF THE INVENTION

1. Field of the Invention

The present invention pertains to valves. More specifically, it pertains to gate valves. In particular, it pertains to a gate valve suitable for transfer of particulate solid materials such as grain, wood chips, dust, coal or any other type.

2. Description of the Prior Art

Many industrial processes which utilize particulate materials require means for transferring these materials between bins, hoppers, trucks, conveyors and the like. Of course, when material transfer is involved, there is usually some need for being able to terminate transfer or flow of the material from one area of containment to another. Simple sliding plates or gate valves are suitable for many of these systems. However, some processes which utilize particulate materils require that these materials be transferred to an area of relatively high pressure, such as a pressure vessel. In these cases, not only must the valve or other device be able to stop and initiate flow of material, it must also provide a fluidtight seal. Providing a fluidtight seal with particulate materials is more difficult than with fluid materials, since the particulates may come between the valve seat and closure member, preventing proper seating. Furthermore, particulate handling valves are more subject to wear, due to the abrasion of seating surfaces by the particulate material. Thus, operation of such valves is less reliable and maintenance is more costly.

Many fluid-handling gate valves have been developed for reducing friction during movement of the gate or closure member from the open to the closed position. Some sort of wedge construction may be provided so that once the gate reaches the closed position it is wedged into tight sealing engagement with the seat. Examples of such valves may be seen in U.S. Pat. Nos. 2,676,780 and 3,003,742. However, these valves are not entirely suitable for handling particulates. One problem with the use of such valves in particulate handling systems is the collection or build-up of particulates within the valve housing which might impair and eventually prevent operation.

SUMMARY OF THE PRESENT INVENTION

In the present invention, a valve is provided which comprises: a housing having an opening therethrough around which is provided a seat; a closure assembly for blocking flow through the opening; and an actuator assembly connected to the closure assembly for moving it between a first position, out of the flow path of the opening, to a second position in the flow path. The closure member is preferably of a double wedge type construction and is expandable, in the second position, for sealing engagement with the seat.

Since the closure member is expandable and contractable, it may be moved between its first and second positions in the contracted state so as to eliminate or at least reduce abrasive wear on the closure member and seat during such movement. Once it has reached the second position, it may then be expanded to create a seal. A unique biasing arrangement is provided for holding the closure member away from the seat during the movement between the first and second positions. In addition, wiper arrangements are provided to assure that the seat and the surface of the closure member which it engages is wiped clean of any deleterious particulate materials. In addition, the housing of the valve is open at each end so that any extraneous particulate due to overflow or other spilling may be displaced from the valve by the closure member as it moves between first and second positions.

The construction of the valve of the present invention makes it uniquely suited for handling of particulates. It is simple in construction yet highly reliable and maintenance free. Many other objects and advantages of the invention will be apparent from the specification which follows in conjunction with the accompanying drawings.

BRIEF DESCRIPTION OF THE DRAWINGS

FIG. 1 is a partially cut-away perspective view of the valve of the present invention, according to a preferred embodiment thereof;

FIG. 5 is a partial side elevation view of the valve of the present invention, enlarged to illustrate the details of wiper assemblies therefor;

FIG. 6 is an enlarged and elevation, taken along line 6—6 of FIG. 5, to more fully illustrate the seat wiper assembly;

FIG. 7 is an enlarged end elevation to more fully illustrate the closure wiper assembly.

DESCRIPTION OF A PREFERRED EMBODIMENT

Figure 2:
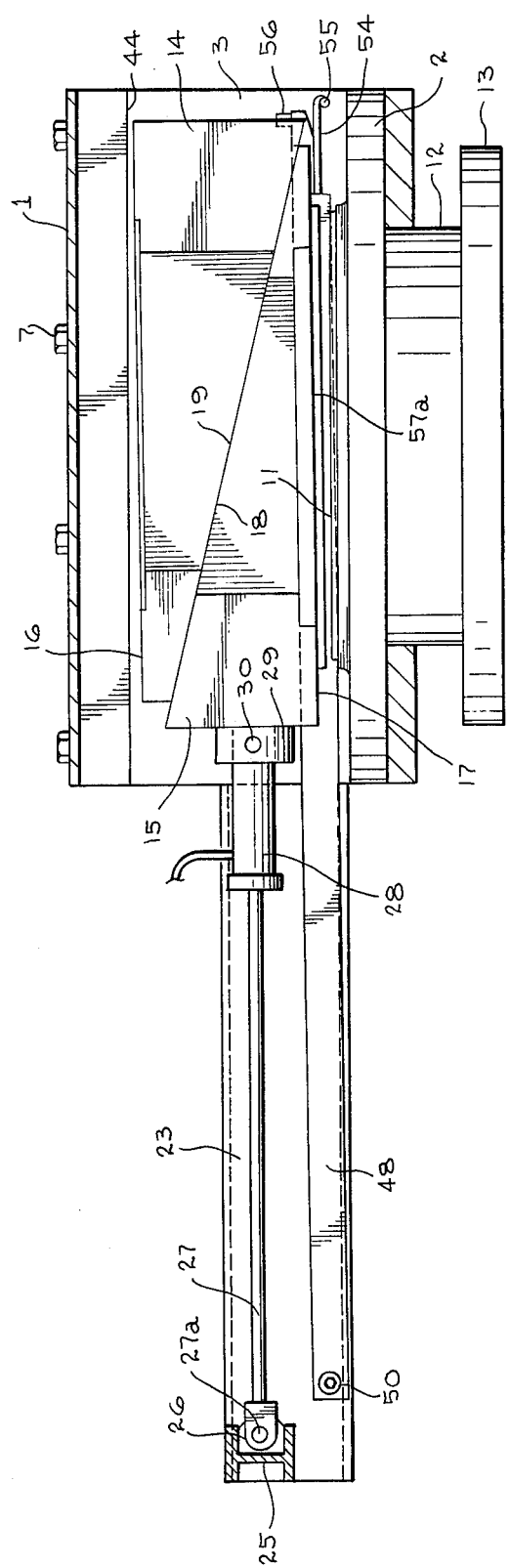
FIG. 2 is a elevational side view of the valve of the present invention, with one of its side plates removed.

Referring first to FIG. 1, there is shown a horizontally installed valve V, according to a preferred embodiment of the invention. The valve V is shown attached to a pressure vessel P into which particulate materials may be fed through the valve V. The valve V generally comprises a housing H, a double-wedge closure member C, and an actuator assembly A, a portion of which is obscured by the closure member in FIG. 1.

Also referring to FIGS. 2–4, and FIG. 8 the housing H may include upper or front plate 1 and lower or rear plate 2 connected by side plates 3 and 4. Reinforcing members 5 and 6 may be provided to reinforce the housing. Although the side plates 3 and 4 may be attached in any suitable way, they are shown in the drawings as being connected by threaded machine bolts 7 and 8. Both the upper and lower plates are provided with flow openings 9 and 10, respectively. The lower opening 10 is surrounded by a seat member 11. The seat member is preferably replaceable and invertable within a groove provided therefor and may be selected from any suitable material.

The housing may also include a conduit 12 and flange 13 by which the valve may be connected to the pressure vessel P or any other portion of the system desired. The conduit 12 provides communication between the lower opening 10 and the pressure vessel P.

Figure 3:
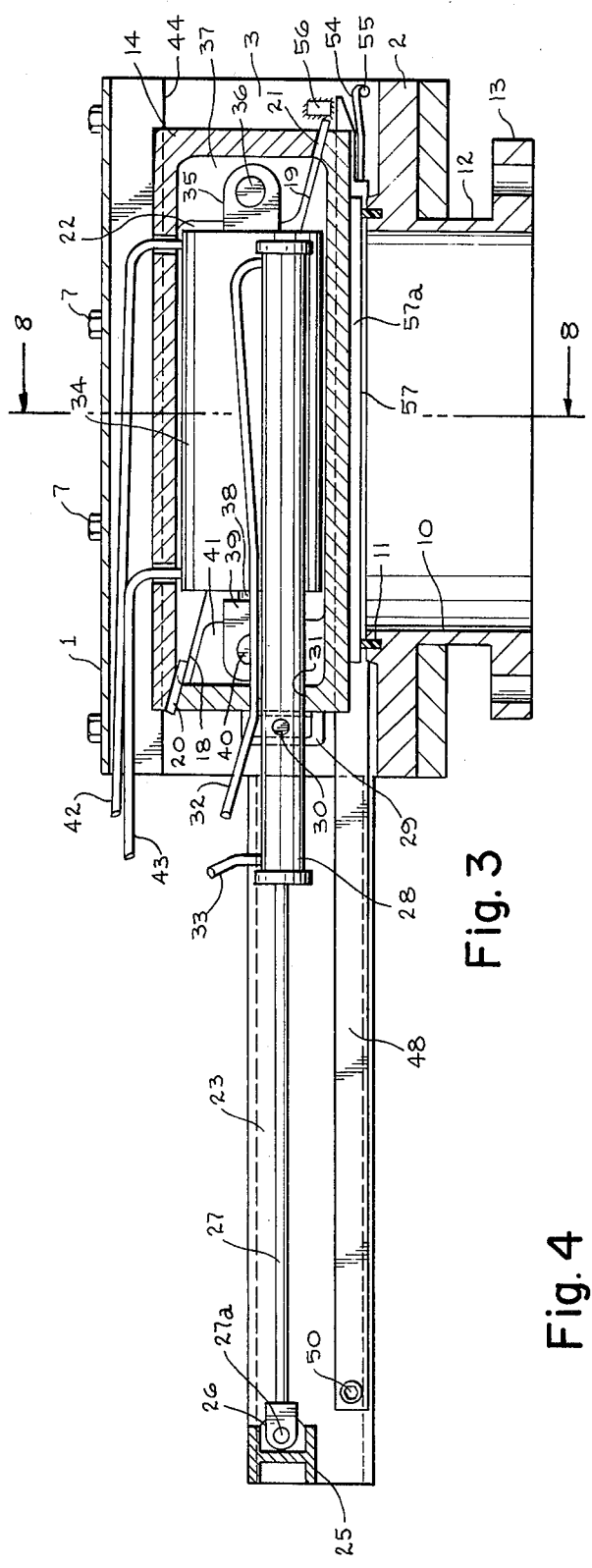
FIG. 3 is an elevational side view, in partial section, of a preferred embodiment of the invention.
Figure 8:
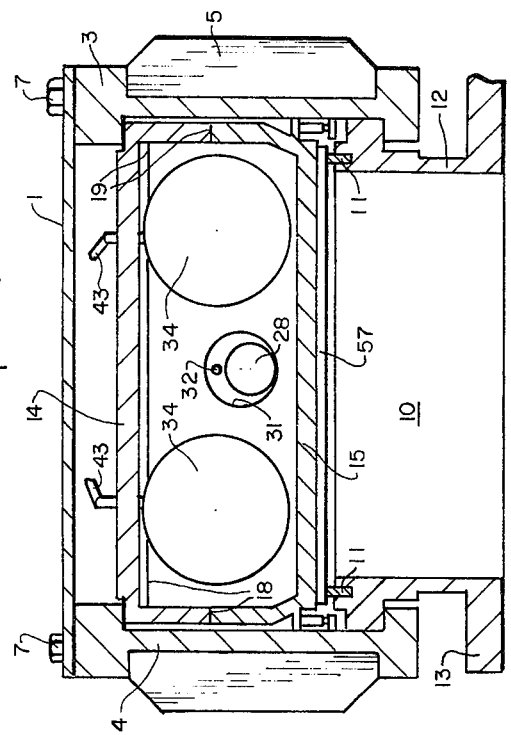
FIG. 8 is a cross-sectional elevation view of the valve of the present invention, taken along line 8—8 of FIG. 3, and illustrating the relationship of actuator assemblies within the closure element.
Figure 4:
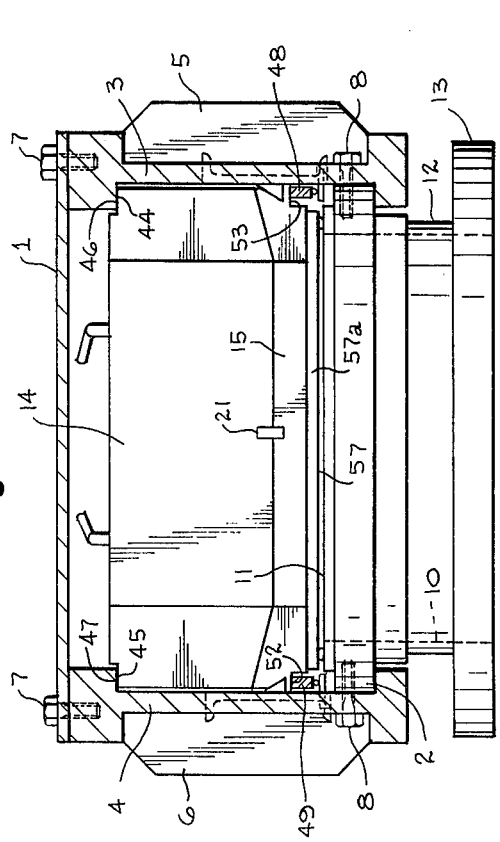
FIG. 4 is an end elevation view of the valve of the present invention.

The closure assembly C comprises a pair of opposed wedge members 14 and 15, the outer faces 16 and 17, respectively, of which are substantially perpendicular to the axis of the flow openings 9 and 10. The mutual faces 18 and 19 of the wedge members are inclined relative to the flow axis so that relative transverse movement the wedge members effects expansion and contraction of the closure assembly. The closure contracted position is shown in FIGS. 1 and 2 while the closure expanded position is shown in FIGS. 3 and 4. To assure proper relative movement between the opposing members 14 and 15, mutually engageable keys and keyways 20 and 21 may be provided. The wedge members may be relieved or hollowed out to define a chamber 22 is which a portion of the actuator assembly may be disposed, as will be more clearly understood hereafter.

It will be noted that the side plates 3 and 4 are provided with extensions 23 and 24 which may be connected at their outer ends by a crossmember 25. The crossmember 25 is provided with a web 26 to which the outer end of a rod 27 may be pinned at 27a. The rod 27 is one of the components of a hydraulic actuator 28 which makes up a part of the actuator assembly of the present invention. The purpose of the first described actuator 28 is to move the closure assembly between a first position, as shown in FIG. 1, out of the flow path of the openings 9 and 10, and a second position, as shown in FIG. 2, in the flow path of the openings.

The actuator 28 may be of any suitable type. The one illustrated is of the hydraulic piston and cylinder type in which the cylinder is attached to one of the closure wedge members 15 by a bracket and pin arrangement 29 and 30. A hole 31 may be provided through one end of the lower wedge member so that a substantial portion of the actuator cylinder 28 may be disposed within the chamber 22. Hydraulic operating lines 32 and 33 may be extended to any suitable hydraulic pressure source. For the present, it is sufficient to note that extension of the actuator 28 moves the closure assembly from the first to the second position. Conversely, contraction moves the closure member from the second position to the first position.

The actuator assembly also includes, in the preferred embodiment, a pair of closure expansion actuators 34 disposed within the chamber 22 on opposite sides of actuator 28. One end of each actuator may be provided with a clevis 35 for attachment by pin 36 to a cooperating web 37 of the upper wedge member 14. The rod 38 of actuator 34 may also be provided with a clevis 39 for attachment by pin 40 to a cooperating web 41 of the other wedge member. Hydraulic fluid lines 42 and 42 connect the actuators 34 with an appropriate source of hydraulic fluid.

Although in the preferred embodiment, there are two expansion actuators 34, the invention could be easily adapted for one. Furthermore, it should be understood that electrical, mechanical and other means of operation could be substituted for the hydraulic actuators 34.

When the actuators 34 are in the fully extended positions, the opposing wedge members 14 and 15 of the closure assembly C are in the closure contracted position shown in FIGS. 1 and 2. it will be noted that with the wedges in this position, biasing means, to be more fully described hereafter, biases the closure assembly away from engagement with the seat 11. upon application of hydraulic pressure to the actuators 34, causing them to contract, the upper wedge member 14 moves transversely, relative to the lower wedge member, along the mutually engaging inclined surface and is guided by the key and keyways 20 and 21 to the closure expanded position of FIG. 3 where the lower surface of wedge member 15 sealingly engages seat 11 in a fluid-tight seal. This may be referred to as the expanded position of the closure assembly C. It should be noted that with the actuators 34 arranged as shown and using the same pressure level, a greater force may be applied for contracting the closure assembly C than in its expansion. This is due to the differential areas created by the rod members 38.

At this point, it is desirable to more fully understand the movement of the closure assembly C from the first position of FIG. 1 to the second position of FIG. 2. During such movement, the closure assembly rides on two pair of rails, a fixed pair and a movable pair. The fixed pair of rails may be provided by downwardly facing surfaces 44 and 45 of side plates 3 and 4, respectively. The upper face of upper wedge member 14 may be slightly relieved along its edges to provide cooperating upwardly facing surfaces 46 and 47.

The movable pair of rails may comprise a pair of elongated members 48 and 49 pivotally attached at 50 and 51 to the extensions 23 and 24 of side plates 3 and 4. The lower rails, 48 and 49, extend all the way from the pivot connections 50 and 51 through the housing and past the seat member 11. The lower face of the lower wedge member 15 may be relieved along its outer edges to provide downwardly facing surfaces 52 and 53 for sliding engagement with the rail members 48 and 49. Thus, it can be seen that in its movement from the first position of FIG. 1 to the second position of FIG. 2, the closure assembly C will slide and rest directly on the rail members 48 and 49.

As best seen in FIG. 2, a spring 54 may be attached to the free end of rail members 48 and 49. The end of the spring rests on a pin 55 attached to the housing side plates 3 and 4. The springs 54 are strong enough to bias the closure assembly C away from the seat 11. Biasing is limited by engagement of the ends of the rail members with stop members 56, also attached to the housing. However, once the closure assembly has been moved by actuator 28 from the first position to its second position and the actuators 34 have been activated to expand the closure assembly, this biasing is overcome to force the lower wedge member 15 into sealing engagement with seat 11. The backup for this expansion movement is provided by the engagement of the upper wedge member with the fixed pair of rails 46 and 47.

The lower face of the lower wedge 15 may be provided with a machined surface 57 for proper sealing engagement with the seat member 11. In fact, the sealing surface 57 may be carried on a separate seal plate 57a which may be attached to the lower wedge 15 by bolts or other means. Both sides of the plate 57a may be machined so that it may be inverted to provide a renewed sealing surface. Since the surface 57 is biased away from seat member 11 during movement of the closure assembly C from the first to second positions, the wear normally associated with sliding gate valves is eliminated. The surface 57 and seat 11 engage each other only during expansion of the closure assembly C. Thus, abrasive friction movement is eliminated.

Since it is anticipated that this valve will be used with particulate materials, it is desirable that features be provided which will eliminate particulates between the seat 11 and the engaging surface 57 of the closure assembly C. One feature to reduce such is the construction of the housing H itself. As previously mentioned, the ends of the housing H are completely open, as seen in FIG. 4. Thus, any large amount of overflow or spill will be pushed out of the valve housing H upon movement of the closure assembly C between the first and second position.

Other features which assure clean engaging surfaces are seat and closure wiper assemblies 58 and 59, respectively. (See FIGS. 5–7) The seat wiper assembly 58 comprises a wiper blade 60 mounted on a rotating axis 61 at the leading edge of wedge member 15. The axis 61 may be rotatably mounted on brackets 62 and 63 attached to the wedge member 15. The wiper blade 60 may be provided with an ear or extension 64 by which a biasing spring 65 is attached. The biasing spring 65 is attached at the opposite end to a mounting bracket 66. The wiper blade 60 is thus biased into the vertical position shown in FIG. 5. The wiper blade 60, in its vertical position, extends below the level of seat 11 so that as the closure assembly C is moved from the first position of FIG. 1 to the second position of FIG. 2, the wiper blade engages the set 11 with a slight pressure, sweeping away or cleaning any debris which might be present on the seat 11, as illustrated by the dashed line in FIG. 5.

It is, of course, also desirable for the sealing surface 57 of the lower wedge member 15 to be cleaned prior to engagement with the seat 11. This is the function of the other wiper assembly 59. The wiper assembly 59 may also comprise a wiper blade 67 rotatably mounted on an axis 68 journalled in a suitable extension 69. A counterweight 70, or any other suitable arrangement, may be provided to bias the wiper blade 67 in an upwardly extending vertical position. The wiper assembly 59 is preferred mounted on the lower plate 2 adjacent the seat member 11. As the closure assembly C moves between the first and second positions, the wiper blade 67 engages and wipes clean the sealing surface 57 of the lower wedge member 15. Thus a clean seat 11 and sealing surface 57 are assured prior to expansion of the closure assembly into sealing engagement.

STATEMENT OF OPERATION

Referring now to all of the drawings, a brief statement of the operation of the valve of the present invention will be given. Starting from the inactive or open position of FIG. 1, the translating actuator 28 is first caused to extend moving the closure assembly C toward its second position, as shown in FIG. 2, in the flow path of the opening 10. The closure assembly C slides along the rails 48 an 49 to the second position. The rails are so biased that the sealing surface 57 of the closure assembly C does not yet engage the seat 11. However, the wiper assembly 58 does engage the seat 11 during this movement wiping it clean. At the same time, the sealing surface 57 of the closure assembly is wiped clean by wiper assembly 59.

Once the closure assembly C reaches the second position of FIG. 2, the wedge actuators 34 may be activated, causing the upper and lower wedge members 14 and 15 to move, relative to each other, along their mutually inclined surfaces from the contracted position of FIG. 2 to the expanded position of FIG. 3. Actually, thhe lower wedge member 15 remains stationary during expansion, being held in place by translating actuator 28 and in this position, the upper wedge member is forced against the fixed rails 46 and 47 and the lower wedge member overcomes the bias of movable rails 48 and 49 so that the sealing surface 57 of the lower wedge member engages the seat member 11. The pressure applied to the actuator 34 is sufficient to create a fluidtight seal against the pressure within the vessel or other component of the system. Pressure may be maintained on the wedge actuators 34 to assure that the seal is maintained. In addition, the angle of the inclined mutual surfaces of the wedge members 14 and 15 may be designed for self-locking so that even if pressure is lost to the actuators 34, this seal will be maintained.

To open the valve, the procedure is simply reversed. The wedge actuators 34 are extended causing the wedge members to return to the contracted position of FIG. 2. Then the translating actuator 28 may be contracted returning the closure assembly C to the first position of FIG. 1.

CONCLUSION

Thus, the present invention provides a gate type valve highly suitable for use with particulate materials. Its unique features significantly reduce the wear and maintenance present in other valves in similar services. It is simple in construction and operation and although it is specifically designed for particulate materials, it could be used for others.

Only a single preferred embodiment has been described herein. Those skilled in the art would be able to devise many variations of the invention without departing from the spirit thereof. Therefore, it is intended that the scope of the invention be limited only by the claims which follow.

We claim:
1. A valve comprising:
   a housing having at least one opening therethrough around which is provided a seat;
   closure means having a seat engaging surface thereon for blocking flow through said opening;
   actuator means connected to said closure means for transversely moving said closure means relative to the flow path of said opening, between a first position, out of said flow path, and a second position, in said flow path;
   biasing means carried by said housing biasing said closure means away from said seat during movement between said first and second positions without engaging said seat engaging surface during said movement; and
   means for expanding said closure means when in said second position, in a direction parallel to said flow path for sealingly engaging said seat engaging surface with said seat means to provide a fluidtight seal of said opening.

2. A valve as defined in claim 1 in which said closure means comprises a pair of opposing wedge members at least one of which is mounted for limited transverse movement relative to said flow path, when said closure member is in said second position, to effect said expansion of said closure means to sealingly engage said seat.

3. A valve as defined in claim 2 including second actuator means connected to said wedge members for effecting said closure means expansion.

4. A valve as defined in claim 2 comprising guide means on which said closure means slides during said movement between said first and second positions.

5. A valve as defined in claim 4 in which said guide means comprises a pair of rail members on which said closure means slides during said movement between said first and second positions.

6. A valve as defined in claim 5 in which said biasing means engages said rail members for biasing said closure means away from engagement with said seat during said movement between said first and second positions, said biasing means being overcome during said expansion of said closure means to allow engagement with said seat.

7. A valve as set forth in claim 6 in which one end of each of said rail members is pivotally connected to said housing, the opposite end engaging said biasing means and being free for movement in a direction generally away from said seat.

8. A valve as set forth in claim 1 comprising wiper means carried by said closure means ahead of said seat engaging surface and engageable with said seat means during said movement between said first and second positions to clean said seat.

9. A valve as set forth in claim 8 comprising second wiper means engageable with said closure means eat engaging surface during said movement between said first and second position to clean said seat engaging surface of said closure means before engagement with said seat means and before expansion of said closure means.

10. A valve as defined in claim 1 in which said housing is fully opened at the end toward which said closure means moves, when moving to said second position, to allow displacement of any deleterious material from the vicinity of said seat.

11. A valve comprising:
 a housing including front and rear portions connected by side portions, said front and rear portions being provided with flow openings, around at least one of which is provided a seat;
 closure means for blocking said flow openings comprising a pair of adjacent and opposing wedge members the outer faces of which are substantially perpendicular to the axis of said flow openings, the mutual and engaging faces of which are inclined relative to said axis, so that relative transverse movement between said wedge members in a first direction effects expansion of said closure means for sealing engagement with said seat;
 actuation means connected to said closure means for moving said closure means between a first position, out of the flow path of said openings, to a second position, in said flow path, and for expanding said closure means, when in said second position, for said sealing engagement with said seat; and
 biasing means carried by said housing biasing said closure means away from said seat during movement between said first and second positions, said biasing means capable of being overcome upon said expansion of said closure means to permit said sealing engagement of said seat.

12. A valve as defined in claim 11 in which the outer face of one of said wedge members is engageable with said seat upon said expansion to provide said fluidtight seal, said outer face being held, without being engaged thereby, by said biasing means, out of engagement with said seat during movement of said closure means between said first and second positions.

13. A valve as defined in claim 12 in which said biasing means comprises a pair of rail members on which said one of said wedge members slides during said movement between said first and second positions, said rail members being biased away from said seat by spring means, said biasing means being overcomeable by said closure means expansion to permit said sealing engagement with said seat.

14. A valve described in claim 12 in which said wedge member outer face is provided by an invertable sealing plate removably attached to said wedge member for inversion and renewal of the sealing surface thereof.

15. A valve as described in claim 11 in which said actuation means comprises an actuator assembly connected to each of said opposing wedge members for producing said relative transverse movement therebetween to effect said closure member expansion.

16. A valve as described in claim 15 in which said opposing wedge members define an enclosed chamber in which said actuator assembly is mounted for protection from the surrounding environment.

17. A valve as described in claim 15 in which said actuator assembly comprises a hydraulic piston and cylinder actuator, the piston rod of which is attached so that, with the same pressure, a greater force may be delivered to said closure member for relative transverse movement in a direction opposite said first direction than for relative transverse movement during said expansion.

18. A valve as set forth in claim 15 in which said actuation means comprises a second actuator assembly connected to said housing and said closure means for moving said closure means between said first and second positions.

19. A valve as set forth in claim 11 in which one end of said housing is fully opened to allow deleterious material collected in said housing to be displaced therefrom by said closure means during movement between said first and second positions.

20. A valve as set forth in claim 19 comprising wiper means carried by said closure means and engageable with said seat during said movement between said first and second positions to clean said seat.

21. A valve as set forth in claim 20 comprising wiper means carried by said housing and engageable with said closure means during said movement between said first and second positions to clean the portion of said closure member engageable with said seat.

22. A valve as set forth in claim 11 in which said closure means is provided with a seal plate for said sealing engagement, both said seal plate and said seat being invertable and replaceable.

23. A valve as set forth in claim 11 in which said biasing means comprises a pair of rail members along which said closure means slides between said first and second positions, said rail members being biased and mounted for limited movement away from said seat member to prevent said engagement of said seat during said closure means movement between said first and second positions.

24. A valve comprising:
 a housing having at least one opening therethrough around which is provided a seat;
 closure means for blocking flow through said opening comprising a pair of opposing wedge members at least one of which is mounted for limited transverse movement relative to said flow path to effect expansion and contraction of said closure means in a direction parallel to said flow path;
 first actuator means connected to said closure means for transversely moving said closure means relative to the flow path of said opening, between a first position, out of said flow path, and a second position, in said flow path; and
 second actuator means connected to said wedge members for expanding said closure means, when in said second position, for sealingly engaging said seat means to provide a fluidtight seal of said opening, said second actuator means being mounted for protection from the surrounding environment in an enclosed chamber defined by said opposing wedge members.

25. A valve as defined in claim 24 comprising means for biasing said closure means out of engagement with said seat during said movement between said first and second positions.

* * * * *

UNITED STATES PATENT OFFICE
CERTIFICATE OF CORRECTION

Patent No. 4,036,260             Dated   July 19, 1977

Inventor(s) Albert Sidney Davis; Robert William Davis; Paul Weber

It is certified that error appears in the above-identified patent and that said Letters Patent are hereby corrected as shown below:

Column 7, line 16: change "eat" to -- seat --.

Signed and Sealed this

Eleventh Day of October 1977

[SEAL]

Attest:

RUTH C. MASON  
Attesting Officer

LUTRELLE F. PARKER  
Acting Commissioner of Patents and Trademarks